(12) United States Patent
Hsu et al.

(10) Patent No.: US 12,475,291 B2
(45) Date of Patent: Nov. 18, 2025

(54) METHOD FOR GENERATING ANALOG SCHEMATIC DIAGRAM BASED ON BUILDING BLOCK CLASSIFICATION AND REINFORCEMENT LEARNING

(71) Applicant: AnaGlobe Technology, Inc., Hsinchu (TW)

(72) Inventors: Hung-Yun Hsu, Yunlin County (TW); Po-Hung Lin, Hsinchu County (TW); Yu-Tsang Hsieh, Hsinchu County (TW)

(73) Assignee: ANAGLOBE TECHNOLOGY, INC., Hsinchu (TW)

( * ) Notice: Subject to any disclaimer, the term of this patent is extended or adjusted under 35 U.S.C. 154(b) by 536 days.

(21) Appl. No.: 17/941,406

(22) Filed: Sep. 9, 2022

(65) Prior Publication Data
US 2024/0086606 A1    Mar. 14, 2024

(51) Int. Cl.
*G06F 30/373*    (2020.01)
*G06N 20/00*    (2019.01)

(52) U.S. Cl.
CPC ........... *G06F 30/373* (2020.01); *G06N 20/00* (2019.01)

(58) Field of Classification Search
USPC ....................................................... 716/120
See application file for complete search history.

(56) References Cited

U.S. PATENT DOCUMENTS 10,706,206 B1 * 7/2020 Kabir .................... G06F 30/398
2017/0116498 A1 * 4/2017 Raveane .............. G06V 10/454

* cited by examiner

*Primary Examiner* — Bryce M Aisaka
(74) *Attorney, Agent, or Firm* — Muncy, Geissler, Olds & Lowe, P.C.

(57) ABSTRACT

A method for generating analog schematic diagram based on building block classification and reinforcement learning is disclosed. First of all, deeper relationship features among devices with building block classification are obtained. Secondly, the device leveling gives an initial device placement topology resulting from the current/signal flows in the circuit netlist. Thirdly, reinforcement learning is applied to refine placement and routing topologies by embedding the building blocks and current/signal flow information into feature vectors. Pattern routing and maze routing algorithms are performed for local and global interconnections, respectively, followed by placement adjustment for density balancing and space minimization to obtain aesthetic analog circuit schematics.

20 Claims, 10 Drawing Sheets

METHOD FOR GENERATING ANALOG SCHEMATIC DIAGRAM BASED ON BUILDING BLOCK CLASSIFICATION AND REINFORCEMENT LEARNING

TECHNICAL FIELD

The present invention relates to schematic visualization for an analog circuit, and more particularly, to a method for generating analog schematic diagram based on building block classification and reinforcement learning.

BACKGROUND

Analog circuit designs are quite different from digital circuit designs from a layout perspective. Unlike a large-scale digital design, an analog circuit design usually has a relatively small scale, i.e., an analog circuit typically has a relatively small die size. However, its physical behavior is very sensitive to the layout geometry, e.g., parasitic coupling effect, small signal transmission, wiring crossovers, etc. Hence, area minimization is usually not a concern for an analog circuit design. A digital circuit designer can leverage mature commercial electronic design automation (EDA) tools to automate layout generation. However, the existing and popular way to generate an analog circuit layout is far from automatic. The manual, time-consuming, error-prone task highly depends on the layout designer's experience and wit. However, analog circuit design automation has become desirable.

Schematic visualization is important for analog circuit designers to quickly recognize the structures and functions of transistor-level circuit netlists. However, most of the original analog design or other automatically extracted analog circuits are stored in the form of transistor-level netlists in the SPICE format. It can be error-prone and time-consuming to manually create an elegant and readable schematic from a netlist.

Traditionally, analog circuitry has been manually laid out into its semiconductor mask layers for semiconductor manufacturing. This is because a human layout designer typically was experienced in analog circuit layout with prior knowledge, experience, and skill as to how the devices in an analog circuit were laid out so as to provide better performance and/or better noise immunity. The human layout designer can make some choices up front prior to laying out the analog circuitry. However, the number of choices that can be made up-front prior to layout by a human layout designer are limited. Moreover, a human layout designer requires considerable time to layout an entire analog circuit chip.

Fewer related works addressed schematic diagram generation for analog ICs (for example: B. Arsintescu, "A method for analog circuits visualization," in Proc. ICCD, 1996, pp. 454-459; Lee and McNamee, "Aesthetic routing for transistor schematics," in Proc. ICCAD, 1992, pp. 35-38). Arsintescu proposed a symmetry-based placement algorithm by extracting symmetrical structures in a given netlist, and Lee and McNamee focused on schematic routing with net crossing minimization. However, modern commercial tools may still fail to generate qualified aesthetic schematic diagrams for various kinds of analog circuits.

Furthermore, schematic visualization is important for analog circuit designers to quickly recognize the structures and functions of transistor-level circuit netlists. With the growing demand and complexity of analog integrated circuits (ICs) for many system-on-chip (SoC) applications, reviewing and debugging various analog ICs with schematic visualization become inevitable. However, most of the original analog design or other automatically extracted analog circuits are stored in the form of transistor-level netlists in the SPICE format for circuit simulation. It can be error-prone and time-consuming to manually create an elegant and readable schematic from a netlist.

Consequently, it is essential to automatically convert the SPICE netlist into an aesthetic schematic view for better understanding an analog design by the proposed invention.

SUMMARY OF THE INVENTION

In this invention, a method for generating analog schematic diagram based on building block classification and reinforcement learning is disclosed, which is executed by a computer, the method comprising using the computer to perform the following: performing a feature extraction of a target analog circuit to classify different analog building blocks with corresponding topological features by a classifier; performing a device leveling of the target analog circuit to give an initial device placement topology resulting from current flows in a circuit netlist by an analyzer; and performing a reinforcement learning to refine device placement and routing topologies by embedding building blocks and the current flows into feature vectors.

According to one aspect, the level of each device is obtained by tracing a corresponding current flow.

According to another aspect, the classifier is used to automatically identify a type of each of all building blocks.

According to one aspect, when tracing said current flows of said target analog circuit, it starts with a power supply signal, and follows a current direction of each device until ground signal. When a device belonging to a differential pair is traversed, the other device of the differential pair is included in the same current flow with the same device level. When a current flow from a power supply signal contains two sub-flows due to current splitting, first devices of both sub-flows have the same device level. When two or more sub-flows are merged before reaching ground signal, devices after current merging only exists in one of the sub-flows.

According to another aspect, the device symbols are moved around a given checkerboard, where a size is determined by a maximum number of the current flows and a maximum device level during the reinforcement learning process.

According to yet another aspect, when a placement result for all device symbols on the checkerboard is obtained, interconnection of each net is routed. A pattern routing is applied for local interconnections of various kinds of routing patterns, and a line-search maze routing algorithm is applied for said global interconnections while minimizing numbers of wire bends and net crossings, as well as total wire length.

In the invention, a non-transitory computer-readable medium containing instructions is proposed, which when read and executed by a computer, cause the computer to execute a method for generating analog schematic diagram, wherein the method comprises the above-mentioned steps.

BRIEF DESCRIPTION OF THE DRAWINGS

The components, characteristics and advantages of the present invention may be understood by the detailed descriptions of the preferred embodiments outlined in the specification and the drawings attached.

DETAILED DESCRIPTION

Some preferred embodiments of the present invention will now be described in greater detail. However, it should be recognized that the preferred embodiments of the present invention are provided for illustration rather than limiting the present invention. In addition, the present invention can be practiced in a wide range of other embodiments besides those explicitly described, and the scope of the present invention is not expressly limited except as specified in the accompanying claims.

In order to gain more experts' knowledge during analog layout generation, the present invention describes an analog schematic diagram to produce a new analog circuit structure (layout). The proposed algorithm includes two major stages: comprehensive building block classification and reinforcement learning described as the following. Embodiments of the present invention may be used in a variety of layout applications.

Different from the conventional graph-based methods, this invention introduces a novel generation flow of an analog schematic diagram based on comprehensive building block classification and reinforcement learning.

In design of an analog circuit, a netlist is a description of the connectivity of an electronic circuit. A sub-circuit is a basic building block with a circuit function (e.g., current mirror, differential pair). In addition to the analog building block, any customized analog or digital basic circuit (e.g., inverter) also belong to a sub-circuit. In real analog design, the building blocks may overlap each other, which means that a device may belong to multiple building blocks.

In the invention, inputting the Simulation Program with Integrated Circuit Emphasis (SPICE) netlist of an analog circuit, an aesthetic readable schematic diagram is then generated, which satisfies the following properties:

The devices in each building block of the analog circuit should be placed according to the topological feature type of the building block.

The bounded area of each analog building block should be minimized.

The numbers of total wire bends and net crossings should be minimized.

Figure 1:
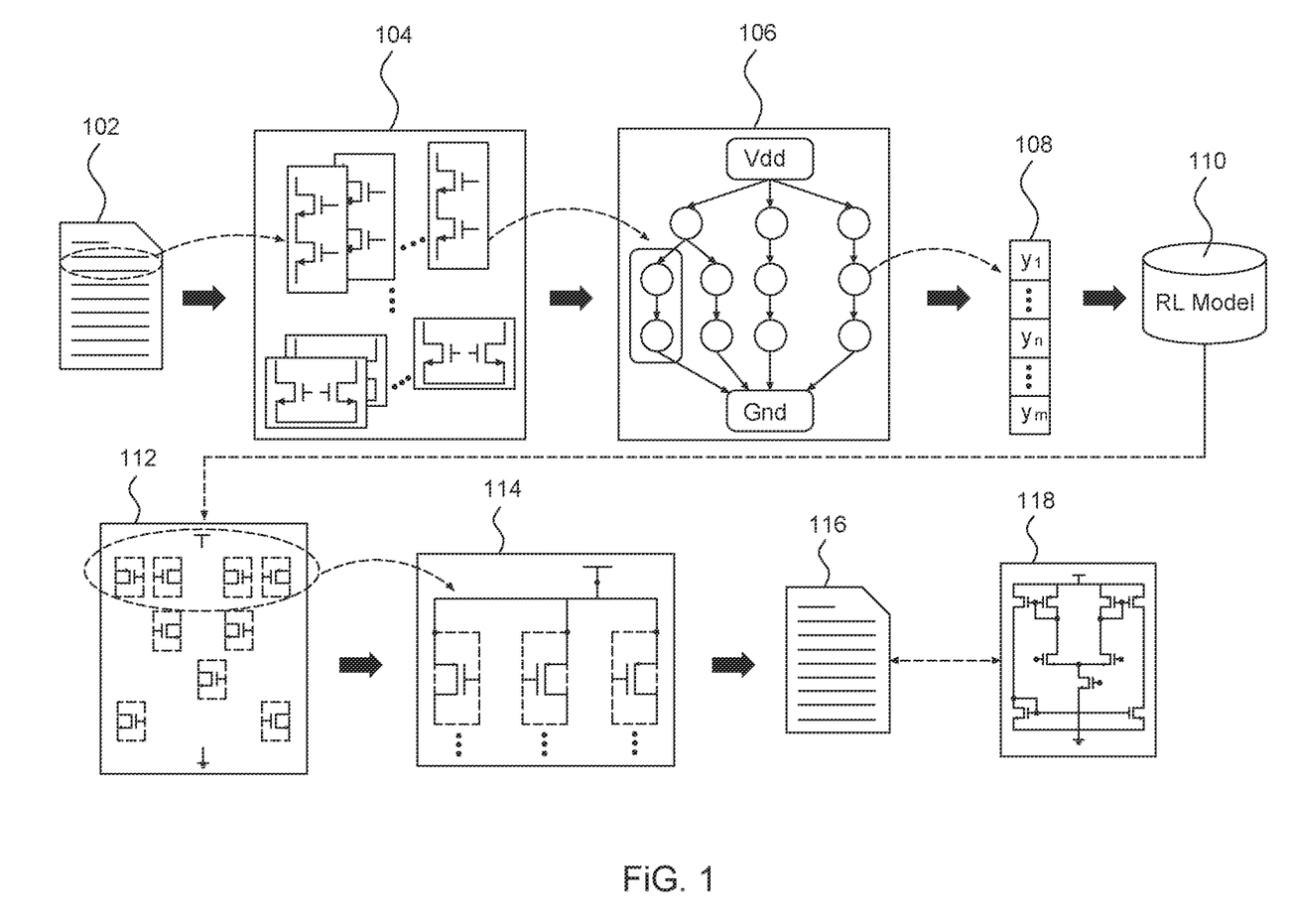
FIG. 1 shows an overview of the proposed method for generating analog schematic diagram with the reinforcement learning technique.

The invention proposes a method for generating a novel analog schematic diagram based on building block classification and reinforcement learning, as shown in FIG. 1. First of all, deeper relationship features among devices with building block classification 104 are obtained. Secondly, the device leveling 106 gives an initial device placement topology resulting from the current/signal flows in the circuit netlist (netlist file) 102 by an analyzer. Thirdly, reinforcement learning is applied to refine placement and routing topologies by embedding the building blocks and current/signal flow information into feature vectors. Then, pattern routing and maze routing algorithms are performed for local and global interconnections, respectively, followed by placement adjustment for density balancing and space minimization. The resulting schematic diagram 118 is stored in an EDIF file 116, which is compatible with commercial EDA tools. EDIF (Electronic Design Interchange Format) is a vendor-neutral format based on S-Expressions in which to store electronic netlists and schematics. It was one of the first attempts to establish a neutral data exchange format for the electronic design automation (EDA) industry. The detailed description of a method for generating analog schematic diagram based on building block classification and reinforcement learning is described as the following.

Figure 2:
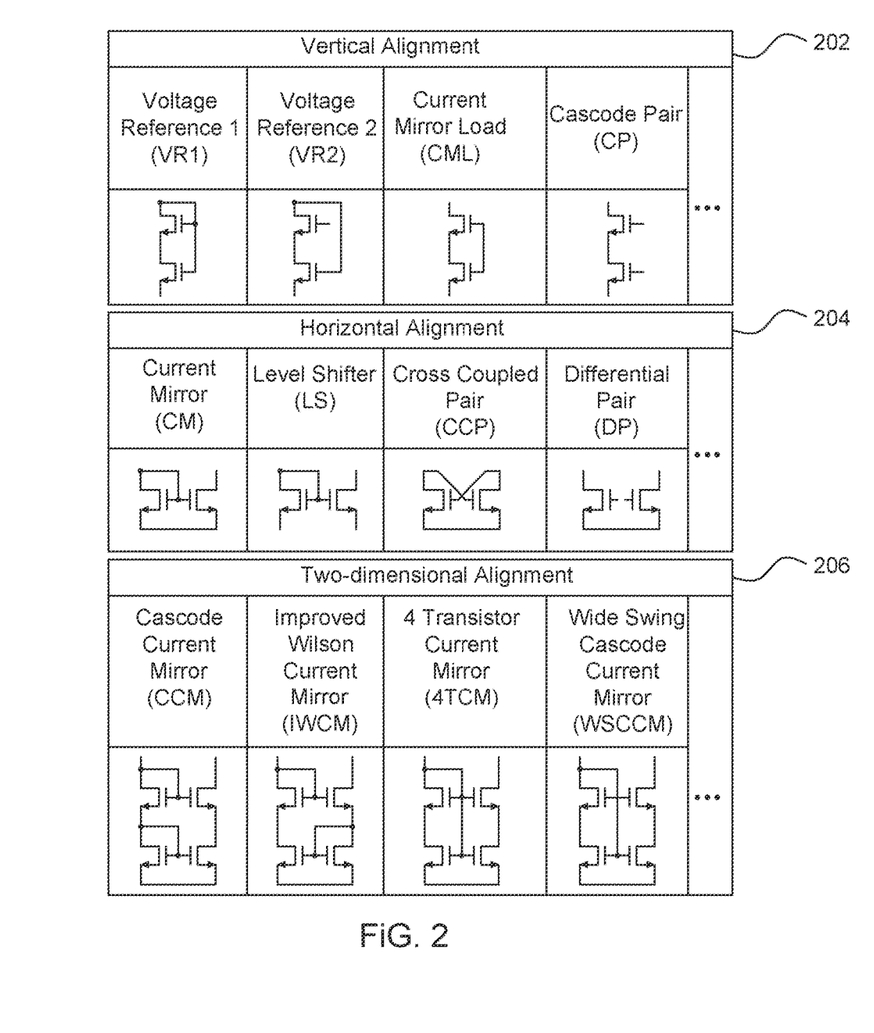
FIG. 2 shows analog building blocks, and three types of their schematic topologies, including vertical alignment, horizontal alignment, and two-dimensional alignment.

Building Block Classification:

First, the method for generating a novel analog schematic diagram comprises providing an analog circuit netlist (netlist file) 102. The schematic of a target circuit is an input data. Then, the building block classification 104 is performed, wherein an example is shown in FIG. 2. In the building block classification 104, a feature extraction process of a target analog circuit is performed to classify different analog building blocks with corresponding topological features by a classifier. In order to easily visualize an analog circuit netlist, building block identification and classification is essential, which helps understand analog circuit structures and functionalities. Instead of applying the graph-based methods, which can be time-consuming for identifying comprehensive analog building blocks in larger analog designs, the invention adopts the machine-learning based method (M. P.-H. Lin, H.-Y. Chi, A. Patyal, Z.-Y. Liu, J.-J. Zhao, C.-N. J. Liu, and H.-M. Chen, "Achieving analog layout integrity through learning and migration invited talk," in Proc. ICCAD, 2020, pp. 1-8) to efficiently extract different analog building blocks with the implicit topological features to obtain the classification of building blocks.

The algorithm for building block classification is the algorithm of the previous patent; refer to "Method for Recognizing Analog Circuit Structure", US Patent US20220058325A1.

FIG. 2 shows an example of analog building blocks, which can be classified into three different types in terms of topological features, including vertical alignment 202, horizontal alignment 204 and two-dimensional alignment 206. The schematic of the target circuit corresponds to the following circuit functions, which can either be given by designers or automatically extracted. For example, in topology of the vertical alignment 202, circuit functions of analog building blocks include voltage reference 1 (VR1), voltage reference 2 (VR2), current mirror load (CML) and cascode pair (CP), between two MOS devices. In topology of the horizontal alignment 204, circuit functions of analog building blocks include current mirror (CM), level shifter (LS), cross coupled pair (CCP) and differential pair (DP), between two MOS devices. In topology of the two-dimensional alignment 206, circuit functions of analog building blocks of includes cascode current mirror (CCM), improved Wilson current mirror (IWCM), 4 transistor current mirror (4TCM) and wide swing cascode current mirror (WSCCM), between four MOS devices. These topological features have great impacts on the readability of the building blocks in the schematic view. If a schematic generator fails to recognize a building block and its corresponding feature, the generated schematic diagram may result in very poor readability.

Figure 3:
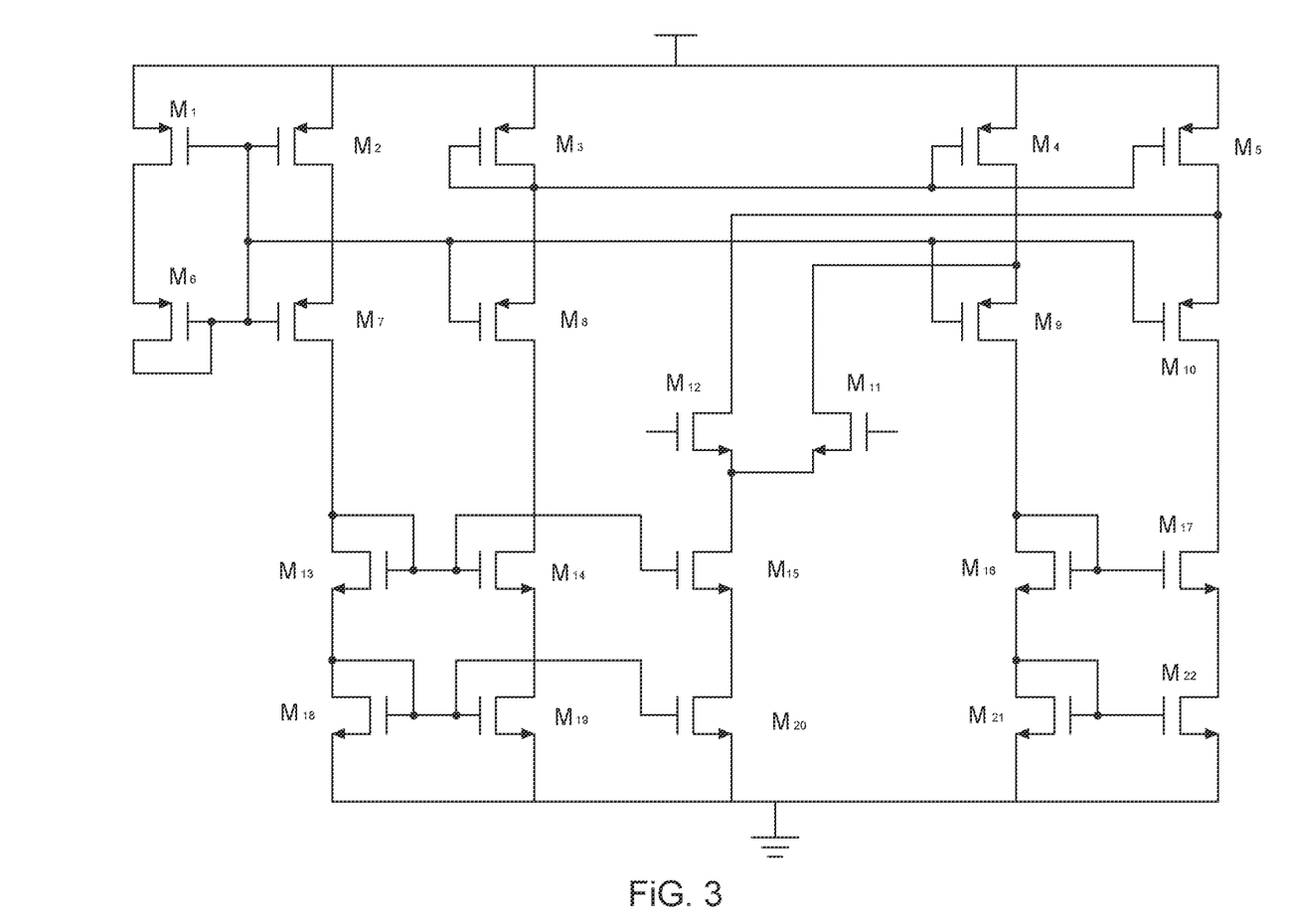
FIG. 3 illustrates an example of device leveling for the schematic of folded cascode OpAmp.
Figure 4:
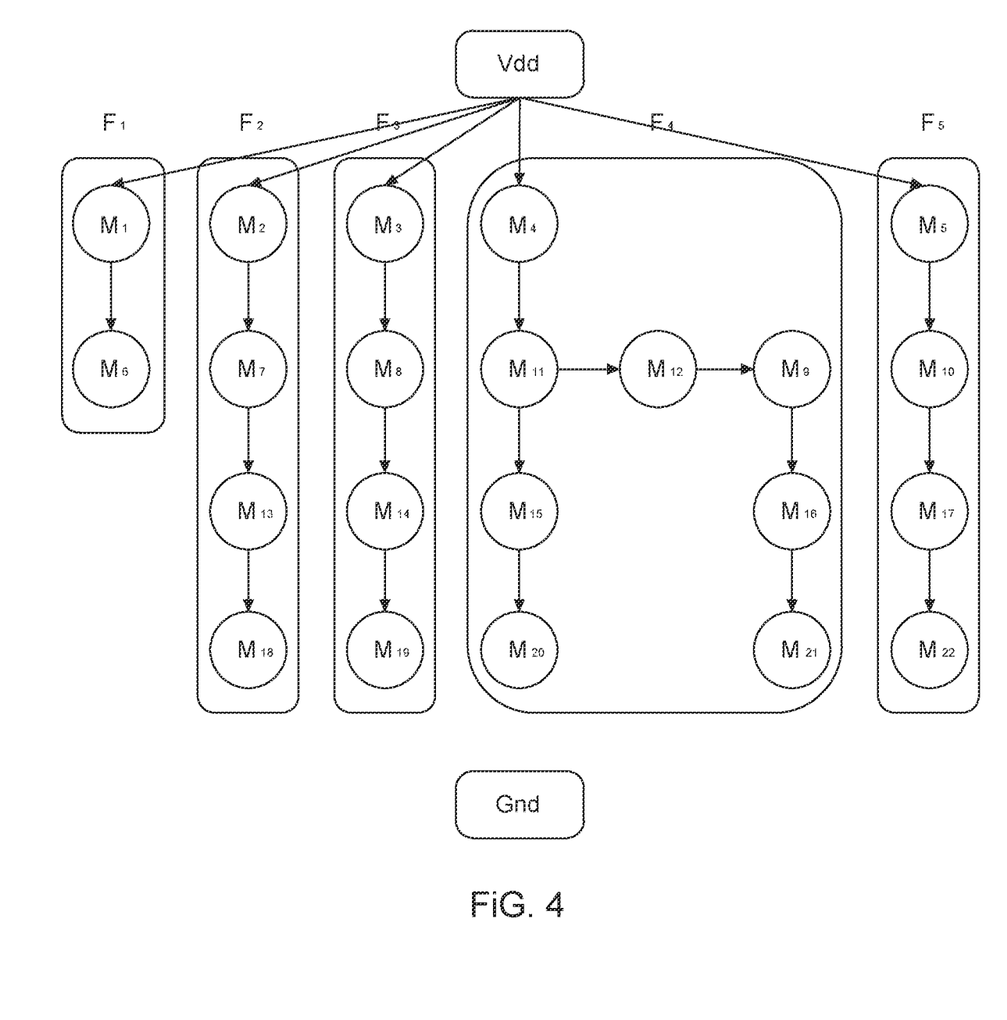
FIG. 4 shows the resulting device leveling based on current flow tracing.

Device Leveling:

After classifying building blocks, the device leveling 106 is performed, wherein an example is shown in FIG. 3 and FIG. 4. In the procedure of 106, a device leveling of the target analog circuit is performed to give an initial device placement topology resulting from the current/signal flows in the circuit netlist by an analyzer. In addition to the alignment features of different building blocks, the device levels are also essential for the readability of an analog circuit. The level of each device can be obtained by tracing the corresponding current flows. When tracing the current flows of an analog circuit, it shall start with the power supply signal, Vad, and follow the current direction of each device until the ground signal. The current direction of PMOS or PNP transistors are from the source to drain terminal, while that of NMOS or NPN transistors are from the drain to source terminal. The current direction of passive devices can be either way. FIG. 3 gives an example of device leveling for the folded cascode OpAmp. Obviously, if there is a group including PMOS and NMOS, they ($M_1$ to $M_{22}$) will be separated to different groups according to the nature of features. By tracing the current flow from Vdd to Gnd, five current flows, $F_1$, $F_2$, $F_3$, $F_4$ and $F_5$ can be obtained, as shown in FIG. 4.

Different from most of the previous works, some special conditions during current flow tracing are handled in the present invention.

Differential Pair: When a device belonging to a differential pair is traversed, the other device of the differential pair should be included in the same current flow with the same device level.

Current Splitting: When a current flow from Vdd contains two sub-flows due to current splitting, the first devices of both sub-flows have the same device level.

Current Merging: When two or more sub-flows are merged before reaching Gnd, the devices after current merging only exists in one of the sub-flows.

In FIG. 4, the transistors, $M_{11}$ and $M_{12}$, belong to a different pair. When Mu is traversed to form the current flow, $F_4$, $M_{12}$ should also be included as another sub-flow of $F_4$. As the currents of $M_{11}$ and $M_{12}$ are merged into $M_{15}$, $M_{15}$ and its subsequent devices must appear in only one of the sub-flows. $M_9$-$M_{16}$-$M_{21}$ is another sub-flow of $F_4$ due to current splitting after $M_4$. The device levels of $M_{11}$, $M_{12}$, and My are the same in this case.

Device level refers to the level of a device in the current flow from Vdd to Gnd, which is related to the tree depth in FIG. 4. For example, in the current flow $F_4$, $M_{11}$ locates on the first level, $M_{11}$, $M_{12}$ and My locate on the second level, Mis and $M_{16}$ locate on the third level, and $M_{20}$ and $M_{21}$ locate on the fourth level.

The algorithm for device leveling is described as the following.

---

Algorithm 1 Device Leveling

---

V: a list of device connected to Vdd.
1: for v ∈ V do
2:    Q ← [v]
3:    while Q is not empty do
4:       n ← Q.pop[0]
5:       C ← Calculate the device connected to the lower terminal of n
6:       for c ∈ C do
7:          if c = C[0] then
8:             Build the vertical constraint for n and c
9:             Q.append(c)
10:         else
11:            Build the horizontal constraint for [0] and c
12:            Q append(c)
13:         end if
14:
15:         if c ∈ different pair then
16:            d ← The device belong differnet pair with c
17:            Build the horizontal constraint for C[0] and d
18:            Q.append(d)
19:         end if
20:       end for
21:    end while
22: end for

---

Figure 5:
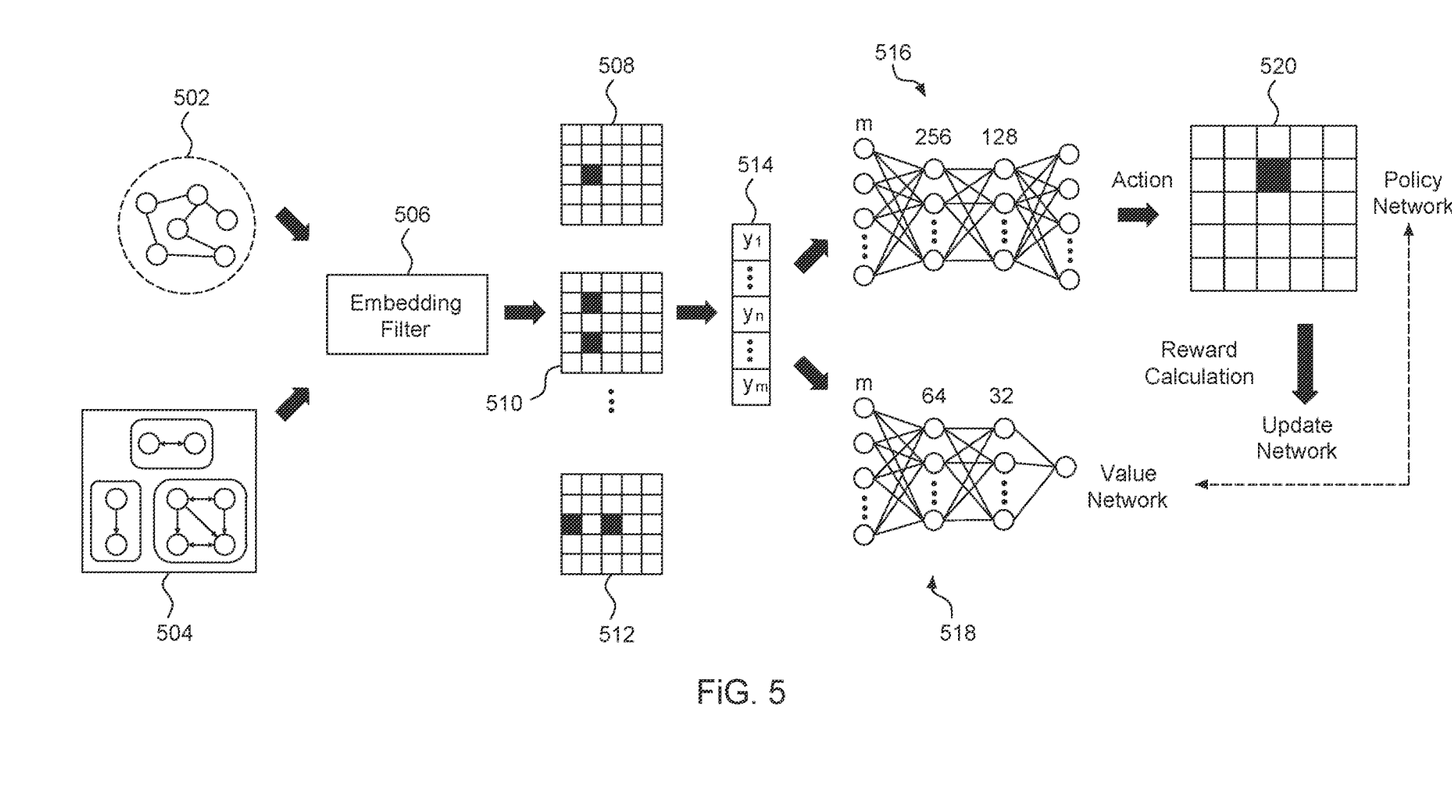
FIG. 5 shows the proposed reinforcement learning architecture for optimal schematic diagram generation.

Reinforcement Learning Based Optimization:

After the device leveling, the reinforcement learning is performed, as shown in FIG. 5. In the reinforcement learning, placement and routing topologies are refined by embedding the building blocks and current/signal flows information into feature vectors. First, state embedding 108 (shown in FIG. 1) is performed, for example, wherein the device and netlist features 502 and building block types 504 are inputted into embedding filters 506 to obtain device locations and orientation 508, device level alignment 510, horizontal alignment 512, on a checkerboard, which can be described by a state 514. The state 514 is classified into a device network 516, and a device network 518. A set of actions is determined by the agent to move the devices to new locations on the checkerboard 520 to obtain new device location and orientation.

Reinforcement learning consists of environment and agent that iterates over the environment, which is a checkerboard in the present invention. At each step, the agent observes the current state of the environment, consults the neural network by inputting the current state, infers the action to be taken based on the output of neural network, and takes the selected action to derive maximal reward. The reinforcement learning based optimization consists of the following three key elements:

State: A state is represented by a vector indicating the current device locations on the checkerboard. It consists of the outputs of multiple filters.

Action: A set of actions is determined by the agent to move the devices to new locations on the checkerboard. The undesirable movements are restricted according to the given constraints, or features.

Reward: A reward is a value determined by the quality metrics of a schematic diagram, including the building block area (BBA), the number of net crossings (NC), the number of wire bends (WB), and the total wire length (WL), as show in Equation (1), where α, β, γ, and δ are weighted factors. The BBA corresponds to the summation of the bounded area of each building block. After performing each action, a reward is calculated to assess the quality of the action.

$$\text{Reward} = -\alpha \times \text{BBA} - \beta \times \text{NC} - \gamma \times \text{WB} - \delta \times \text{WL} \quad (1)$$

Figure 6:
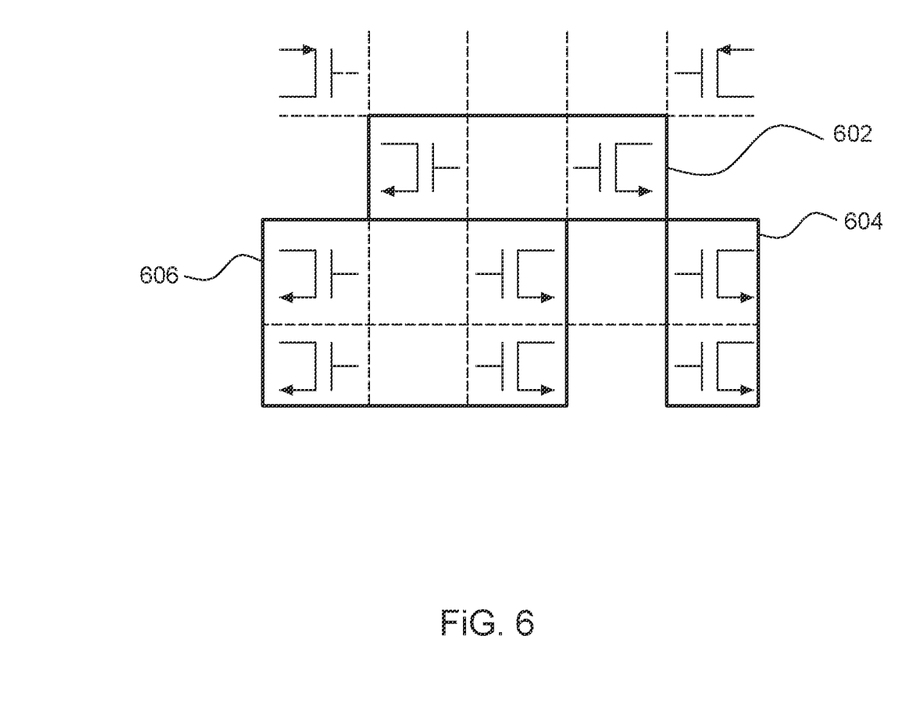
FIG. 6 illustrates the checkerboard placement for device symbols, and the bounded area of each type of the building blocks.

FIG. 6 shows the checkerboard placement for device symbols, and the bounded area of each type of the building blocks, including area of horizontal building block 602, area of vertical building block 604, and area of 2-dimensional (2-D) building block 606. FIG. 6 demonstrates the proposed reinforcement learning architecture for generating optimal schematic diagram, which is carried out in two stages, including state embedding 108 and RL (reinforcement learning) model training 110. The first stage embeds the features, which are obtained from device leveling and building block classification, into a state vector. The second stage trains the model by policy and value networks together with the reward function. RL model training 110 is used for placement and routing optimization, which is proximal policy optimization.

The algorithm for state embedding is described as the following.

---

Algorithm 2 State embedding

--- i: max(maximum number of current flows, the maximum device level).
d: target device.
V: a checkerboard matrix. // V represents the placement result of all devices in the current circuit.
1: M, N, O, P, Q: zero matrix. M, N, O, P, Q ∈ $R^{i \times i}$
2: $S_2$ ← Calculate the devices which has current flow connection with d // $S_2$ is a set of device
3: $S_3$ ← Calculate the devices which has vertical alignment with d // $S_3$ is a set of device
4: $S_4$ ← Calculate the devices which has horizontal alignment with d // $S_4$ is a set of device
5: $S_5$ ← Calculate the devices which has two-dimensional alignment with d // $S_5$ is a set of device
6:
7: M ← Calculate the d current location = 1
8: for j = 1 to j = i do
9:   for k = 1 to k = i do
10:     If $V_{j,k} \in S_2$ then
11:       $N_{j,k}$ ← 1
12:     end if
13:     if $V_{j,k} \in S_3$ then
14:       $O_{j,k}$ ← 1
15:     end if
16:     if $V_{j,k} \in S_4$ then
17:       $P_{j,k}$ ← 1
18:     end if
19:     if $V_{j,k} \in S_5$ then
20:       $Q_{j,k}$ ← 1
21:     end if
22:   end for
23: end for
24:
25: state ← Merge(flatten(M). flatten(N), flatten(O), flatten(P), flatten(Q))
26: return state

---

The proximal policy optimization (PPO) algorithm (J. Schulman, F. Wolski, P. Dhariwal, A. Radford, and O. Klimov, "Proximal policy optimization algorithms," arXiv preprint arXiv: 1707.06347, 2017) is applied, which is considered as the state-of-the-art policy optimization method, to update the parameters of the network. It prevents large changes to the distribution of operations in a single network update with a tailoring objective function of the policy.

Checkerboard Device Placement:

During the reinforcement learning process, the device symbols are moved around a given checkerboard, where the size is determined by the maximum number of current flows and the maximum device level. After moving a device symbol, the device orientation should be simultaneously determined according to the building block types in order to minimize the interconnecting wirelength. It should be noted that the device terminals should also be aligned when determining the locations and orientations of the device symbols.

The checkerboard $M \in R^{i \times i}$, which i is max (maximum number of current flows, the maximum device level). If the device group satisfies the horizontal alignment in FIG. 3, the device on the left will face to the right. The leftmost device in the circuit will also face right. The rest of the devices will face to the left. If the devices are on the same level, the centers of the devices will be aligned. If the device is vertically aligned, the top and bottom 2 terminal slices of the device will be aligned.

Figure 7:
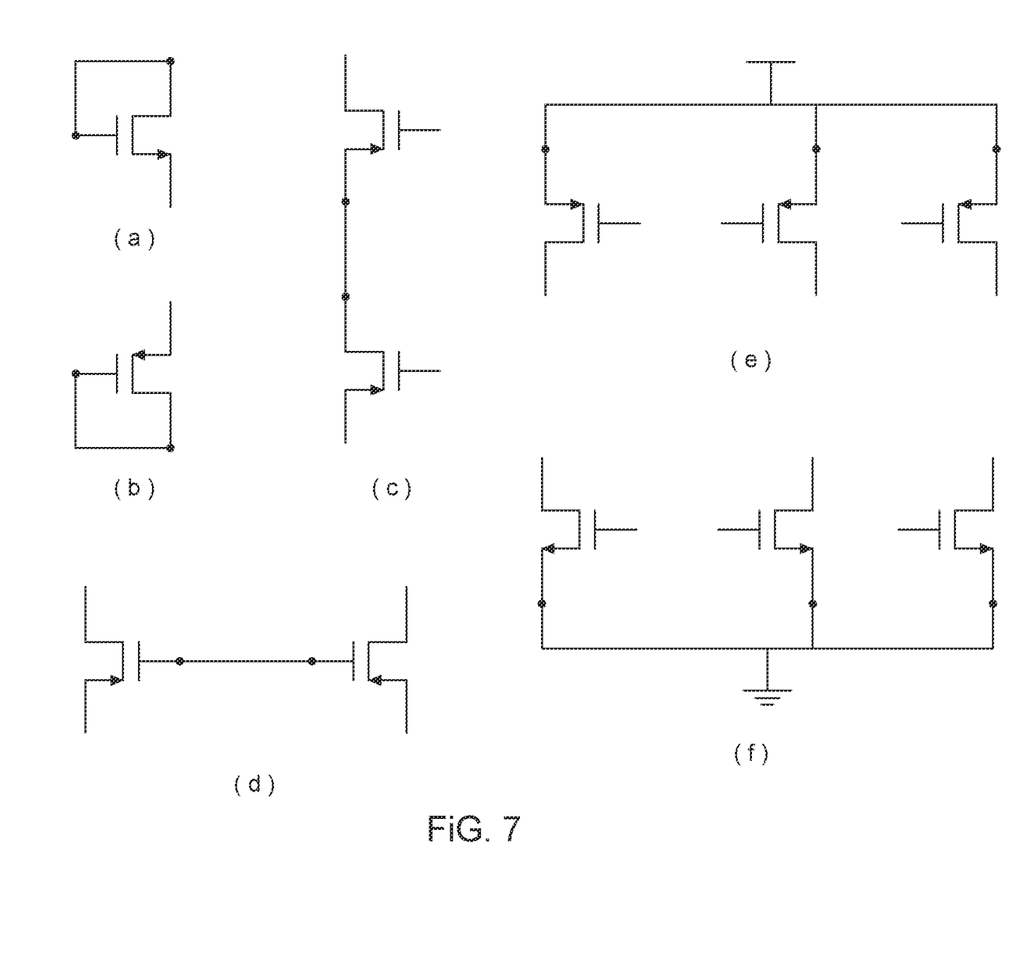
FIG. 7 shows the various routing patterns for local interconnections.

Routing and Post-Routing Refinement:

Once a placement result for all device symbols on the checkerboard is obtained, the interconnection of each net should be routed. Pattern routing is first applied for local interconnections, which considers various kinds of routing patterns, as illustrated in FIG. 7, to speed up the routing process. FIG. 7 illustrates various routing patterns for local interconnections, wherein (a) indicates L shape for NMOS gate and drain, (b) indicates L shape for PMOS gate and drain, (c) indicates I shape for aligned source and drain, (d) I indicates shape for aligned gates, (e) indicates Tree shape for V dd, and (f) indicates Tree shape for Gnd.

The algorithm for pattern routing is described as the following.

---

Algorithm 3 Pattern routing

---

M: a grid map of two-dimensions (n × n) with initial blockages (devices).
N: a list of total net.
1:   for n ∈ N do
2:     if n = Vdd then
3:       label tree shape for Vdd
4:     else if n = Gnd then
5:       label tree shape for Gnd
6:     else
7:       t ← Calculate the terminal in the t.
8:       if any 2 t in same device then
9:         label L shape

| Algorithm 3 Pattern routing |
| --- |
| 10:       end if<br>11:       if no label between 2 t then<br>12:          label I shape<br>13:       end if<br>14:   end if<br>15: end for |

If a net cannot be fully connected with pattern routing, the line-search maze routing algorithm is then applied for those global interconnections while minimizing the numbers of wire bends and net crossings, as well as total wire length. Finally, post-routing refinement is performed to compact, or to extend, the space among the checkerboard grids according to the routing density.

The algorithm for maze routing is described as the following.

| Algorithm 4 Maze Routing |
| --- |
| M: a grid map of two-dimensions (n × n) with initial blockages (devices).<br>S: the source node.<br>1: search_list ← [S]<br>2: while search_list is empty do |

| Algorithm 4 Maze Routing |
| --- |
| 3:    N ← S.pop[0]<br>4:    for 4 orientation do<br>5:       NC ← Calculate N to take a step in the current orientation<br>6:       while NC ∈ M and NC is not blockage do<br>7:          if NC = target node then<br>8:             if all target nodes are found then<br>9:                return<br>10:           else<br>11:              Go line 3<br>12:          end If<br>13:         else:<br>14:            search_list.append(NC)<br>15:         end if<br>16:       NC ← NC Go forward<br>17:       end while<br>18:    end for<br>19: end while |

Experimental Results:

The proposed method for generating analog schematic diagram is implemented by using the Python programming language, and performed the experiments on a 3.8 GHz Intel machine under the Linux operating system with the Nvidia RTX 3080 graphic card. The experiment of the invention is conducted on some representative analog circuits, or different kinds of amplifiers in the invention, as shown in Table I, where the circuits were obtained from previous works.

TABLE I

TABLE I The analog circuits with different numbers of devices, building blocks, and nets.

| Circuit | | # of Devices | | | # of Building Blocks | | | # of Nets |
| --- | --- | --- | --- | --- | --- | --- | --- | --- |
| ID | Circuit Name | PMOS | NMOS | Resistor | Vertical | Horizontal | 2-D | |
| 1 | Low pass filter with OpAmp [18] | 7 | 4 | 0 | 5 | 3 | 1 | 14 |
| 2 | Three stage transimpedance Amp [19] | 4 | 13 | 1 | 6 | 6 | 0 | 15 |
| 3 | Folded cascode OpAmp [20] | 10 | 12 | 0 | 9 | 13 | 4 | 20 |
| 4 | Fully differential OpAmp [20] | 10 | 14 | 0 | 10 | 18 | 2 | 25 |
| 5 | Variable Gain Amp [21] | 10 | 23 | 5 | 16 | 7 | 0 | 36 |

Figure 8:
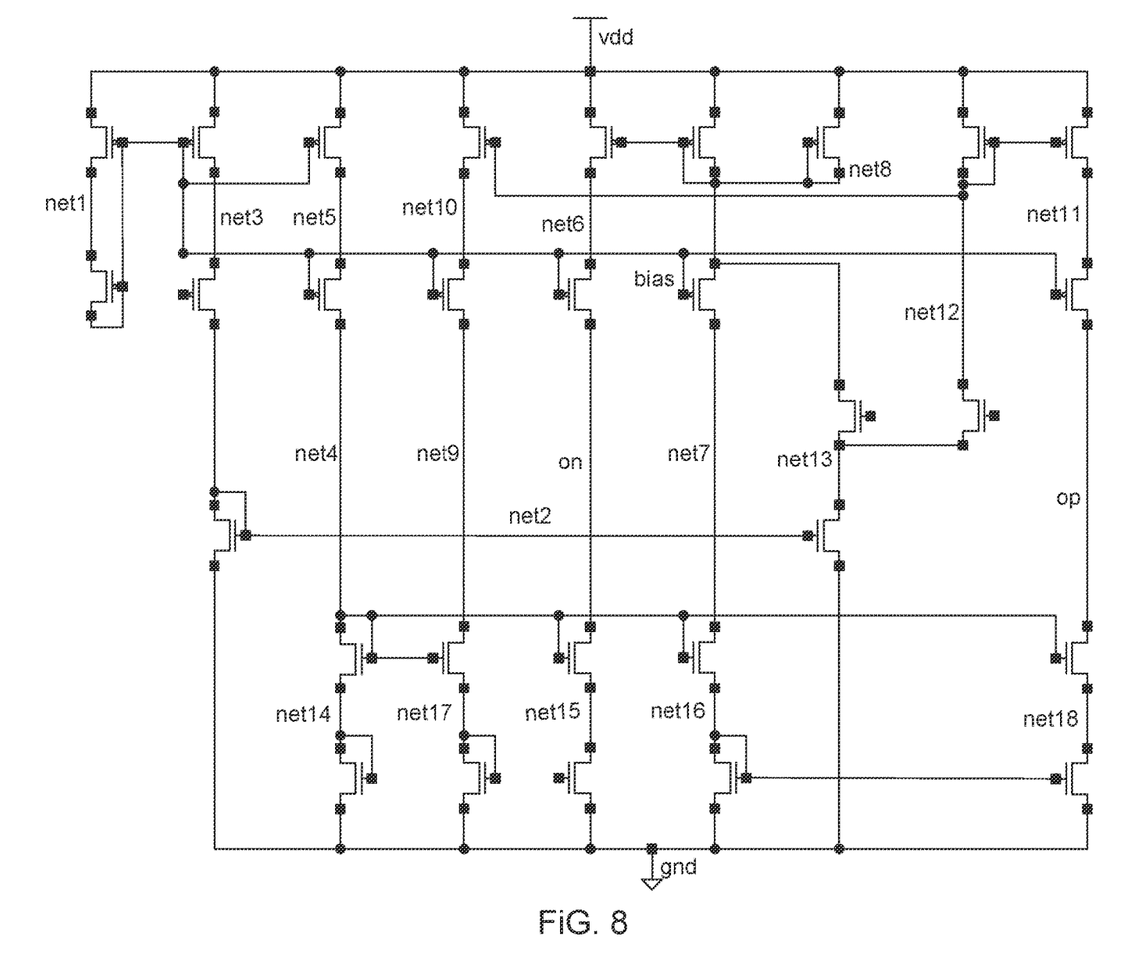
FIG. 8 illustrates the schematic diagrams of Fully differential OpAmp resulting from the proposed method with building block features.
Figure 9:
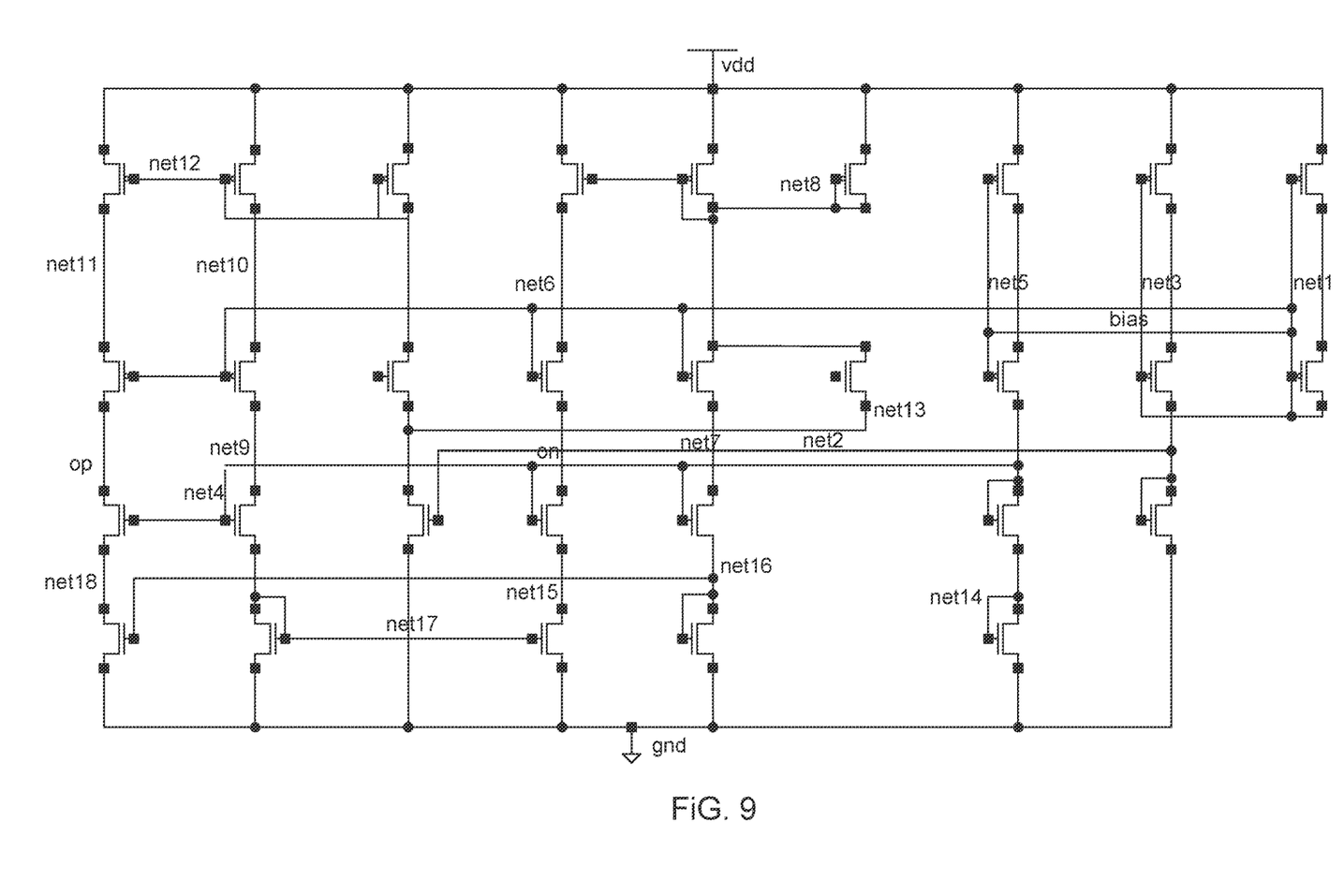
FIG. 9 illustrates the schematic diagrams of Fully differential OpAmp resulting from the proposed method without building block features.
Figure 10:
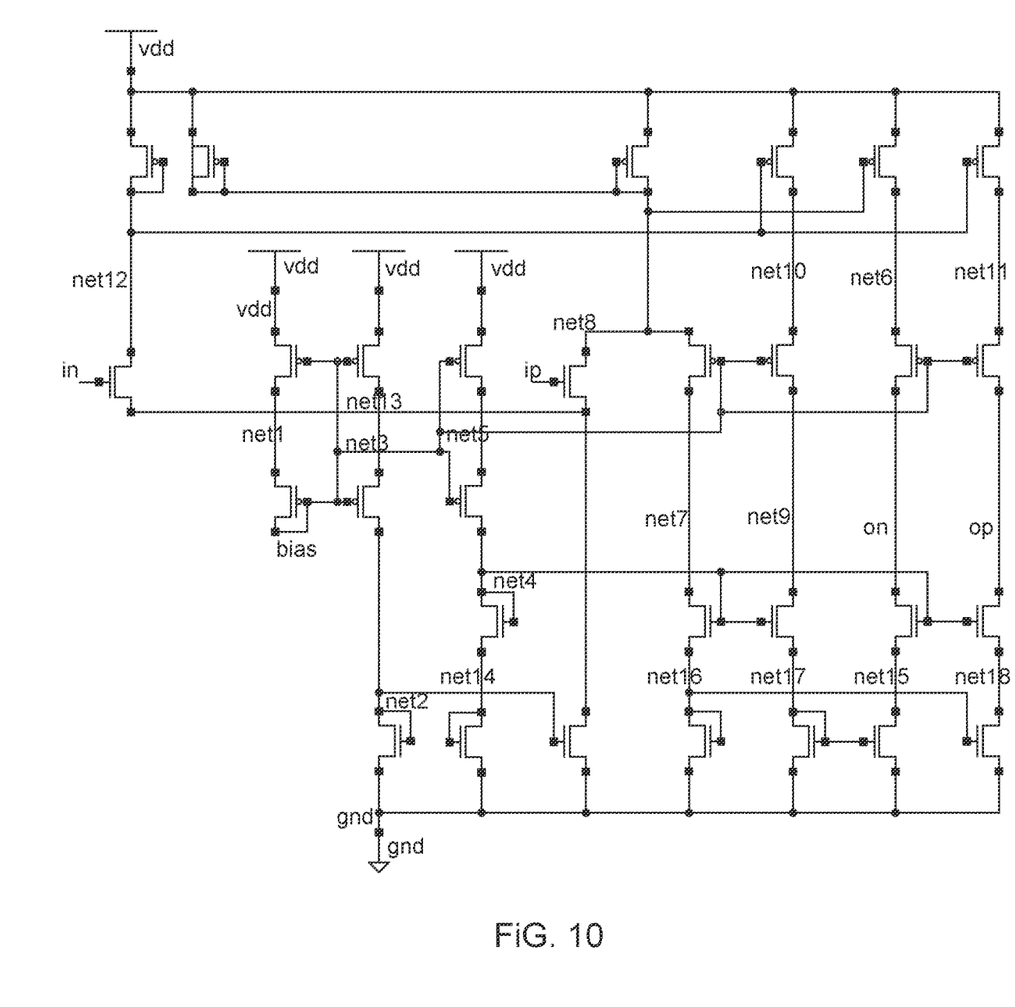
FIG. 10 illustrates the schematic diagrams of Fully differential OpAmp resulting from the Commercial Tool I.

The proposed method is compared with three different approaches, including (1) the proposed method without building block features, (2) Commercial Tool I with the patent (U.S. Pat. No. 7,386,823), and (3) Commercial Tool II. The resulting quality is evaluated based on the aesthetic metrics of schematic diagrams, including the number of wire bends, the number of net crossings, and the number of compliant building blocks. The experimental results are demonstrated in Table II. According to Table II, the proposed method consistently achieves much better quality in terms of the number of wire bends and the number of compliant building blocks for all test cases. The number of net crossings resulting from the proposed method is also better in most of the test cases. The runtime based on all methods on those test cases is within one minute. FIGS. 8-10 further shows the schematic diagrams of "Fully differential OpAmp" resulting from the proposed method with and without building block features, and the Commercial Tool I, respectively.

method for generating analog schematic diagram based on building block classification and reinforcement learning is finished.

According to the invention, the machine learning algorithm includes a feature extraction process and a classification model.

The method further comprises providing a database for the machine learning algorithm. The machine learning algorithm includes at least one neural network and at least one classifier.

In the invention, a classifier is used to automatically identify the type of the building blocks.

The contributions of this invention are summarized in the following:

The invention does comprehensively extract and classify analog building blocks for topological feature generation among devices, and introduce the building block compliance rate as a new aesthetic metric of analog schematic diagrams according to the fulfillment of those topological features.

TABLE II

Comparison of four different methods based on the aesthetic metrics of schematic diagrams.

| Circuit ID | Method | # of Bends | # of Crossing | # of Compliant Building Blocks |
|---|---|---|---|---|
| 1 | Ours | 4 | 1 | 8 (83%) |
|   | Ours w/o building block features | 11 | 4 | 6 (67%) |
|   | Commercial Tool I with the patent [10] | 13 | 4 | 5 (56%) |
|   | Commercial Tool II | 8 | 3 | 6 (67%) |
| 2 | Ours | 6 | 5 | 12 (100%) |
|   | Ours w/o building block features | 14 | 10 | 7 (58%) |
|   | Commercial Tool I with the patent [10] | 9 | 7 | 12 (100%) |
|   | Commercial Tool II | 32 | 20 | 7 (58%) |
| 3 | Ours | 13 | 10 | 26 (96%) |
|   | Ours w/o building block features | 16 | 10 | 21 (78%) |
|   | Commercial Tool I with the patent [10] | 15 | 10 | 20 (74%) |
|   | Commercial Tool II | 40 | 43 | 23 (85%) |
| 4 | Ours | 12 | 18 | 29 (97%) |
|   | Ours w/o building block features | 16 | 27 | 22 (73%) |
|   | Commercial Tool I with the patent [10] | 17 | 23 | 23 (77%) |
|   | Commercial Tool II | 44 | 55 | 23 (77%) |
| 5 | Ours | 23 | 43 | 20 (87%) |
|   | Ours w/o building block features | 42 | 63 | 9 (39%) |
|   | Commercial Tool I with the patent [10] | 40 | 34 | 16 (70%) |
|   | Commercial Tool II | 44 | 55 | 17 (74%) |

In this invention, novel ideas for analog schematic diagram generation based on the aesthetic metrics with the consideration of readability are introduced. A reinforcement learning based method with building block classification and device leveling are proposed for achieving optimal schematic diagrams. The presented method has been validated based on various analog circuits obtained from the literature. Experimental results have shown that, compared with modern commercial tools, the proposed approach can effectively reduce the number of wire bends and net crossings while keeping most of the building block features for better readability.

The experimental results show that the proposed method can effectively generate aesthetic analog circuit schematics with a higher building block compliance rate, and fewer numbers of wire bends and net crossings, resulting in better readability, compared with existing methods and modern tools.

The proposed method for generating an analog schematic diagram in which a computer performs processes of: building block classification and reinforcement learning. Therefore, aesthetic analog circuit schematics are outputted. The The invention does embed all features of devices, nets, and building blocks, and perform reinforcement learning on a checkerboard for placement optimization with a reward function considering the building block are, wire bends, net crossings, and wirelength. All these features are essential for generating readable analog schematic diagrams.

The invention does perform pattern routing for local interconnections and line-search routing for global interconnections, while minimizing the number of total wire bends, net crossings and wire length.

The experimental results show that the proposed method can effectively generate aesthetic analog circuit schematics with a higher building block compliance rate, and fewer numbers of wire bends and net crossings, resulting in better readability.

As will be understood by persons skilled in the art, the foregoing preferred embodiment of the present invention illustrates the present invention rather than limiting the present invention. Having described the invention in connection with a preferred embodiment, modifications will be suggested to those skilled in the art. Thus, the invention is not to be limited to this embodiment, but rather the invention is intended to cover various modifications and similar arrangements included within the spirit and scope of the appended claims, the scope of which should be accorded the broadest interpretation, thereby encompassing all such modifications and similar structures. While the preferred embodiment of the invention has been illustrated and described, it will be appreciated that various changes can be made without departing from the spirit and scope of the invention.

What is claimed is:

1. A non-transitory computer-readable medium containing instructions, which when read and executed by a computer, cause the computer to execute a method for generating analog schematic diagram, wherein the method comprises steps of:
performing a feature extraction of a target analog circuit to classify different analog building blocks with corresponding topological features by a classifier;
performing a device leveling of said target analog circuit to give an initial device placement topology resulting from current flows in a circuit netlist by an analyzer; and
performing a reinforcement learning to refine device placement and routing topologies by embedding building blocks and said current flows into feature vectors.

2. The non-transitory computer-readable medium of claim 1, wherein a level of each device is obtained by tracing a corresponding current flow.

3. The non-transitory computer-readable medium of claim 2, when tracing said current flows of said target analog circuit, it starts with a power supply signal, and follows a current direction of each device until ground signal.

4. The non-transitory computer-readable medium of claim 1, when a device belonging to a differential pair is traversed, the other device of said differential pair is included in the same current flow with the same device level.

5. The non-transitory computer-readable medium of claim 4, when a current flow from a power supply signal contains two sub-flows due to current splitting, first devices of both sub-flows have the same device level.

6. The non-transitory computer-readable medium of claim 5, when two or more sub-flows are merged before reaching ground signal, devices after current merging only exists in one of said sub-flows.

7. The non-transitory computer-readable medium of claim 1, wherein device symbols are moved around a checkerboard, where a size is determined by a maximum number of said current flows and a maximum device level during said reinforcement learning process.

8. The non-transitory computer-readable medium of claim 7, when a placement result for all device symbols on said checkerboard is obtained, interconnection of each net is routed.

9. The non-transitory computer-readable medium of claim 8, further comprising a pattern routing applied for local interconnections of various kinds of routing patterns.

10. The non-transitory computer-readable medium of claim 9, further comprising a line-search maze routing algorithm applied for said local interconnections while minimizing numbers of wire bends and net crossings, as well as total wire length.

11. A method for generating analog schematic diagram, which is executed by a computer, the method comprising:
using the computer to perform the following:
performing a feature extraction of a target analog circuit to classify different analog building blocks with corresponding topological features by a classifier;
performing a device leveling of said target analog circuit to give an initial device placement topology resulting from current flows in a circuit netlist by an analyzer; and
performing a reinforcement learning to refine device placement and routing topologies by embedding building blocks and said current flows into feature vectors.

12. The method of claim 11, wherein a level of each device is obtained by tracing a corresponding current flow.

13. The method of claim 12, when tracing said current flows of said target analog circuit, it starts with a power supply signal, and follows a current direction of each device until ground signal.

14. The method of claim 11, when a device belonging to a differential pair is traversed, the other device of said differential pair is included in the same current flow with the same device level.

15. The method of claim 14, when a current flow from a power supply signal contains two sub-flows due to current splitting, first devices of both sub-flows have the same device level.

16. The method of claim 15, when two or more sub-flows are merged before reaching ground signal, devices after current merging only exists in one of said sub-flows.

17. The method of claim 11, wherein device symbols are moved around a checkerboard, where a size is determined by a maximum number of said current flows and a maximum device level during said reinforcement learning process.

18. The method of claim 17, when a placement result for all device symbols on said checkerboard is obtained, interconnection of each net is routed.

19. The method of claim 18, further comprising a pattern routing applied for local interconnections of various kinds of routing patterns.

20. The method of claim 19, further comprising a line-search maze routing algorithm applied for said local interconnections while minimizing numbers of wire bends and net crossings, as well as total wire length.

* * * * *